United States Patent [19]

King

[11] 3,720,541

[45] March 13, 1973

[54] TRANSPARENT ARTICLES
[75] Inventor: Robert David King, Dorridge, England
[73] Assignee: Tripley Safety Glass Company Limited, London, England
[22] Filed: Nov. 12, 1970
[21] Appl. No.: 88,717

[30] Foreign Application Priority Data
Nov. 20, 1969 Great Britain.....................56,906/69

[52] U.S. Cl. .................117/211, 117/217, 117/33.3, 204/192
[51] Int. Cl. ..............................................B44d 1/18
[58] Field of Search............117/211, 215, 217, 33.3; 204/192

[56] References Cited

UNITED STATES PATENTS

| 2,750,832 | 6/1956 | Morgan | 117/211 X |
| 3,076,727 | 2/1963 | Harwig | 117/211 |
| 3,053,698 | 9/1962 | Ogle et al. | 117/211 |

FOREIGN PATENTS OR APPLICATIONS 769,697  3/1957  Great Britain.......................117/211

Primary Examiner—Alfred L. Leavitt
Assistant Examiner—Cameron K. Weiffenbach
Attorney—Snyder and Butrum

[57] ABSTRACT

An electrically conductive transparent article comprises a transparent base coated with a first layer of metallic compound, a film of electrically conductive material, a second layer of metallic compound, a third layer of metallic compound, and a final protective layer of a siliceous compound. The third layer comprises a metallic compound which is different from that of the second layer and serves to isolate the first and second layers of metallic compound and the film of electrically conductive material from the surface coating of siliceous compound. Preferably the article has a glass base to which is applied in succession, a layer of bismuth oxide, a film of gold, a layer of bismuth oxide, a layer of copper oxide, and a final surface layer of silica.

20 Claims, 1 Drawing Figure

PATENTED MAR 13 1973
3,720,541
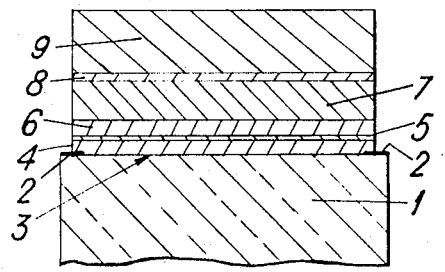
Inventor
ROBERT DAVID KING

3,720,541

TRANSPARENT ARTICLES

BACKGROUND OF THE INVENTION

This invention relates to transparent articles comprising a transparent base having a film of electrically conductive material applied thereto.

An object of this invention is to apply a layer of silica over a film of electrically conductive material, the layer of silica insulating the film of electrically conductive material and being capable of being employed as a surface protective coating.

SUMMARY

According to the invention as electrically conductive transparent article comprises a transparent base, a first transparent layer of metallic compound applied directly to one surface of the transparent base, a transparent film of electrically conductive material applied to said first layer of metallic compound, a second transparent layer of metallic compound applied to said film of electrically conductive material, a third transparent layer of metallic compound applied to said second layer of metallic compound, the metallic compound of said third layer being different from that of said second layer, and a final protective layer of a siliceous compound which insulates the film of electrically conductive material and constitutes a surface coating for the transparent base, the said third layer of metallic compound serving to isolate said first and second layer of metallic compound and the film of electrically conductive material from the surface coating of siliceous compound and to protect the film of electrically conductive material during the application of the siliceous compound.

In a particular form of the invention said transparent base is a vitreous body, e.g., of glass, said first layer of metallic compound is a layer of bismuth oxide having a thickness within the range of 50 to 500 Angstrom units, said film of electrically conductive material is a gold film having a thickness within the range of 50 to 200 Angstrom units, said second layer of metallic compound is a layer of bismuth oxide having a thickness within the range of 50 to 500 Angstrom units, said third layer of metallic compound is a layer of a copper oxide having a thickness within the range of 30 to 2,000 Angstrom units, and said surface coating is a layer of silica having a thickness within the range of 1,000 to 50,000 Angstrom units. In this case it is preferred that said first layer of bismuth oxide has a thickness of about 300 Angstrom units, said gold film has a thickness of about 100 Angstrom units, said second layer of bismuth oxide has a thickness of about 300 Angstrom units, said layer of copper oxide has a thickness of about 100 Angstrom units, and said coating of silica has a thickness of about 1,500 Angstrom units.

There may be provided an additional layer of silicon oxide having a thickness within the range of 30 to 200 Angstrom units disposed between the third layer of metallic compound and the surface coating of siliceous compound, said additional layer serving as a bonding layer between the surface coating and the said third layer of metallic compound. The additional layer of silicon oxide may have a thickness of about 100 Angstrom units.

The invention also includes a method of insulating an electrically conductive transparent article comprising a transparent base coated with a film of electrically conductive material over an initial layer of metallic compound applied directly to one surface of the transparent base, which method comprises applying a layer of metallic compound to said film of electrically conductive material, applying another layer of a different metallic compound to the immediately preceding layer, and then applying a final protective layer of siliceous compound which thereby insulates the film of electrically conductive material, the said other layer of metallic compound isolating the preceding layers of metallic compound and the film of electrically conductive material during the subsequent application of the protective layer of siliceous compound to preclude degeneration of any of said layers or of said film.

An additional layer of silicon oxide may be applied intermediate said other layer of metallic compound and said protective layer of siliceous compound which additional layer serves to bond the subsequent layer of siliceous compound to said other layer of metallic compound.

Preferably the method described above is applied to a transparent base comprising a body of glass and includes the additional step of heat treating the coated glass up to a maximum temperature of 240° C, prior to the application of the protective layer of siliceous compound.

BRIEF DESCRIPTION OF THE DRAWING

The drawing shows a diagrammatic cross-section, by way of example, of an electrically conductive transparent article.

DESCRIPTION OF THE PREFERRED EMBODIMENT

Referring to the drawing there is shown an electrically conductive transparent article comprising a substrate 1 of toughened or strengthened glass which, in practice, may be the desired size and shape of a vehicle windscreen.

The glass substrate 1 has two silver electrodes 2 fired into one of its faces, which in the drawing is designated by the reference numeral 3.

The face 3 of the glass has a first layer 4 of bismuth oxide applied thereto by the known reactive diode sputtering technique in an argon/air mixture at a pressure of $6 \times 10^{-2}$ mm of mercury with the bismuth metal cathode at a potential of −900 volts. The thickness of this first layer 4 of bismuth oxide may be between 50 and 500 Angstrom units but, in this example, in 300 Angstrom units thick.

A gold film 5 having a thickness of 100 Angstrom units, but which may have a thickness between 50 and 200 Angstrom units, is diode sputtered onto the layer 4 of bismuth oxide, the gold film being sputtered in an argon atmosphere at a pressure of $6 \times 10^{-2}$ mm of mercury with the gold cathode at a potential of −1200 volts.

A second layer 6 of bismuth oxide is next sputtered onto the gold film 5, in the same manner as described above for the first layer 4 of bismuth oxide. Again the thickness of this second layer 6 may be between 50 and 500 Angstrom units but, in this example, is 300 Angstrom units thick.

Onto the second layer 6 of bismuth oxide, there is sputtered a layer 7 of copper oxide. This layer 7 is reactively diode sputtered in an argon/air mixture at a pressure of $6 \times 10^{-2}$ mm of mercury with the copper cathode at a potential of $-1000$ volts, to a thickness of 100 Angstrom units. The thickness of this layer 7 of copper oxide may be varied between 30 and 2,000 Angstrom units but it is preferably made near its lower limit of thickness to avoid undesirable light absorption.

The fifth layer 8 of this thin film complex comprises a layer of silicon oxide which is reactively diode sputtered onto the preceding layer 7 of copper oxide in an argon/air mixture at a pressure of $6 \times 10^{-2}$ mm of mercury with the silica cathode at a potential of $-1000$ volts. The thickness of this layer may be varied between 30 and 200 Angstrom units but, in this example, has a thickness of 100 Angstrom units.

In this example, the layers and film 4 to 8 are deposited consecutively onto a horizontally supported glass substrate in the same vacuum chamber, the chamber being maintained under vacuum throughout the process, and the different layers and the film being deposited by moving the required cathode in sequence into position beneath the glass. After the deposition of the fifth layer 8 of silicon oxide, the coated glass substrate is removed from the vacuum chamber. The coated glass is then heat treated in an oven to a maximum temperature of 240° C to stabilize the electrical resistance of the gold film 5 and its adjacent layers 4, 6 of bismuth oxide. By way of example, for a specimen of glass 1½ × 3 inches coated in the above manner, the electrical resistance of the combined gold film 5 and bismuth oxide layers 4, 6 was found to be 25 ohms before heat treatment, but after heat treatment had decreased to 15 ohms.

The heat treated, coated glass is then placed in a vacuum chamber equipped, in known manner for radio frequency sputtering in an argon atmosphere at a pressure of $2.5 \times 10^{-3}$ mm of mercury with a silica target positioned above a copper cathode which has an oscillating potential at a frequency of approximately 10 Mc/sec between $-1100$ volts and earth. A layer 9 of silica is thereby deposited over the previously deposited layer 8 of silicon oxide. The thickness of the layer 9 of silica may be within the range 1,000 to 50,000 Angstrom units but, in this example, a thickness of 1,500 Angstrom units was obtained by establishing a magnetic field of approximately 100 gauss in the sputtering chamber to give a rate of deposition of approximately 30 Angstroms/minute. Such a thickness of silica satisfactorily insulates the electrically conductive gold film 5 up to an applied voltage of 45 volts. For higher applied voltages, the silica layer 9 has to be correspondingly thicker.

The method described above allows the production of electrically conductive transparent articles which are electrically insulated by the surface coating of silica in a manner that does not impair the conductive properties of the gold film 5 between the electrical connections which the electrodes 2 provide along opposed edges of the gold film.

However, it has been found that the bismuth oxide layer 4, the gold film 5 and the bismuth oxide layer 6 respectively cannot be directly coated with a sufficiently thick layer of reactive diode sputtered or radio frequency sputtered silica due to a decomposition of the layers 4, 6 and film 5 which occurs during sputtering. Also, if the layers 8, 9 are deposited without the presence of the intervening layer of copper oxide 7, there is found to be a considerable loss of optical quality and mechanical stability with the layers 4, 6 and film 5. This decomposition does not occur when an intervening layer of copper oxide 7 is deposited on the second layer 6 of bismuth oxide prior to the deposition of the silica.

Additionally, the layer 9 of silica has been found to be satisfactorily resistant to scratching by a blunt metal object and can withstand rigorous rubbing with household glass cleaning fluids. The silica layer is thus suitable for use as a surface protective coating.

The invention is not restricted to the specific details of the example described above. For example the step of depositing the intervening layer 8 of silicon oxide may be omitted.

Also, the substrate 1 may comprise a transparent base of a rigid synthetic plastics material, e.g. stretched polymethyl methacrylate, instead of glass.

The surface coating 9 may be formed of other siliceous compounds besides silica, for example alumino or boro silicates.

Other metal oxides, may be deposited instead of the above specified oxides for the layers 4, 6 and 7. For the layers 4 and 6, other metal oxides such as oxides of iron, aluminum, antimony, cadmium, lead and zinc may be used instead of bismuth oxide. With regard to the third layer 7 of metal oxide, aluminum oxide or gold oxide may be used instead of copper oxide, providing that in the case of aluminum being used, the preceding layer 6 is not also of aluminum oxide.

Alternative metals that may be used instead of gold for the electrically conductive film 5, are silver, copper, palladium and platinum.

It should be appreciated that the terms silicon oxide and silica used above include the oxides of silicon SiO and $SiO_2$ either singly or in combination, since the precise composition of the oxide deposited in each case is not known and may be in a complex form.

We claim:

1. In an electrically conductive transparent article including a transparent base, a first transparent layer of metal oxide applied directly to one surface of said base, a transparent film of electrically conductive metal applied to said first layer, a second transparent layer of metal oxide applied to said film of metal, said first and second layers and said film being susceptible to optical and mechanical degradation incidental to the electrically-induced thermal evaporation deposition of a protective layer of a siliceous compound, a third transparent layer of metal oxide applied to said second layer, the metal oxide of said third layer being different from the metal oxide of said second layer and being of a composition to prevent the aforesaid optical and mechanical degradation, and a protective layer of siliceous compound deposited on said third layer by electrically-induced thermal evaporation.

2. An article according to claim 1, wherein said third transparent layer is of copper oxide.

3. An article according to claim 1, wherein said third transparent layer is of aluminum oxide.

4. An article according to claim 1, wherein said third transparent layer is of gold oxide.

5. An electrically conductive transparent article according to claim 1, wherein said third transparent layer is a layer of copper oxide, and said protective layer of siliceous compound consists of a reactively diode sputtered layer of silica on said copper oxide layer and a radio frequency sputtered layer of silica on said reactively diode sputtered silica layer.

6. An article according to claim 1, wherein the transparent base is a vitreous body.

7. A method of manufacturing an electrically conductive transparent article comprising:
   a. coating a surface of a transparent base with a first transparent layer of metal oxide;
   b. applying a transparent electrically conductive metal film to said first layer of metal oxide;
   c. applying a second transparent layer of metal oxide to said metal film;
   d. applying to said second metal oxide layer a third transparent layer of a metal oxide different from the oxide of said first and second transparent layers and of a composition to prevent optical and mechanical degradation incidental to subsequent electrically-induced thermal evaporation deposition of a protective layer of a siliceous compound; and
   e. applying by electrically-induced thermal evaporation a final protective layer of siliceous compound to said third transparent layer.

8. A method according to claim 7, wherein said transparent base is a vitreous substrate.

9. A method according to claim 8, wherein said third transparent layer is of copper oxide.

10. A method according to claim 8, wherein said third transparent layer is of aluminum oxide.

11. A method according to claim 8, wherein said third transparent layer is of gold oxide.

12. A method of manufacturing an electrically conductive transparent article comprising:
   a. coating a surface of a vitreous substrate with a first transparent layer of metal oxide;
   b. applying a transparent electrically conductive metal film to said first layer of metal oxide;
   c. applying a second transparent layer of metal oxide to said metal film;
   d. applying to said second metal oxide layer a third transparent layer of a metal oxide different from the oxide of said first and second transparent layers and of a composition to prevent optical and mechanical degradation incidental to subsequent electrically-induced thermal evaporation deposition of a protective layer of a siliceous compound;
   e. reactively diode sputtering a layer of silica on to the layer of step (d);
   f. heat treating the coated substrate up to a maximum temperature of 240° C to stabilize the electrical resistance of layers of steps (a), (b) and (c); and
   g. finally radio frequency sputtering a layer of silica on the layer of step (e).

13. An electrically conductive transparent article comprising:
   a. a vitreous base;
   b. a first transparent layer of bismuth oxide applied directly to a surface of the base;
   c. a transparent gold film applied to said first bismuth oxide layer;
   d. a second transparent layer of bismuth oxide applied to said gold film;
   e. a transparent layer of copper oxide applied to said second bismuth oxide layer to protect said bismuth oxide layers and gold film during subsequent sputtering of a protective silica layer; and
   f. a protective layer of silica sputtered on to the copper oxide layer.

14. A method of manufacturing an electrically conductive glass article comprising:
   a. coating a surface of a glass substrate with a first transparent layer of bismuth oxide;
   b. applying a transparent electrically conductive gold film to said first bismuth oxide layer;
   c. applying a second transparent layer of bismuth oxide to said gold film;
   d. applying a layer of copper oxide to said second bismuth oxide layer to protect said bismuth oxide layers and gold film during subsequent sputtering of a protective silica layer;
   e. reactively diode sputtering a bonding layer of silica on to the copper oxide layer;
   f. then heat treating the coated glass substrate up to a maximum temperature of 240° C to stabilize the electrical resistance of the gold film and the bismuth oxide layers; and
   g. finally radio frequency sputtering a protective insulating layer of silica on said bonding silica layer.

15. A method according to claim 14, comprising sputtering on to said copper oxide layer a bonding layer of silica of thickness in the range 30 to 200 Angstrom units, and finally sputtering on to said bonding layer a protective insulating layer of silica of thickness in the range 1,000 to 50,000 Angstrom units.

16. An electrically conductive transparent article comprising:
   a. a vitreous base;
   b. a first transparent layer of bismuth oxide applied directly to a surface of the base;
   c. a transparent gold film applied to said first bismuth oxide layer;
   d. a second transparent layer of bismuth oxide applied to said gold film;
   e. a transparent layer of copper oxide applied to said second bismuth oxide layer to protect said bismuth oxide layers and gold film during subsequent sputtering of a protective silica layer;
   f. a reactively diode sputtered layer of silica on the copper oxide layer; and
   g. a radio frequency sputtered layer of silica on said reactively diode sputtered silica layer.

17. An article according to claim 16, wherein the vitreous base is a glass body, said first layer of bismuth oxide has a thickness within the range of 50 to 500 Angstrom units, said gold film has a thickness within the range of 50 to 200 Angstrom units, said second layer of bismuth oxide has a thickness within the range of 50 to 500 Angstrom units, said layer of copper oxide has a thickness within the range of 30 to 2,000 Angstrom units, and said radio frequency sputtered layer of silica has a thickness within the range of 1,000 to 50,000 Angstrom units.

18. An article according to claim 16, wherein said first layer of bismuth oxide has a thickness of about 300 Angstrom units, said gold film has a thickness of about 100 Angstrom units, said second layer of bismuth oxide has a thickness of about 300 Angstrom units, said layer of copper oxide has a thickness of about 100 Angstrom units, and said radio frequency sputtered layer of silica has a thickness of about 1,500 Angstrom units.

19. An article according to claim 18, wherein said reactively diode sputtered layer of silica has a thickness within the range of 30 to 200 Angstrom units.

20. An article according to claim 19, wherein said reactively diode sputtered layer of silica has a thickness of about 100 Angstrom units.

* * * * *

UNITED STATES PATENT OFFICE
CERTIFICATE OF CORRECTION

Patent No. 3,720,541　　　　　　　　　　Dated March 13, 1973

Inventor(s) Robert David King

It is certified that error appears in the above-identified patent and that said Letters Patent are hereby corrected as shown below:

In the assignee's name "Tripley" should be --Triplex--

Signed and sealed this 10th day of July 1973.

(SEAL)
Attest:

EDWARD M. FLETCHER, JR.　　　　　Rene Tegtmeyer
Attesting Officer　　　　　　　　Acting Commissioner of Patents